Patented Aug. 6, 1935

2,010,689

UNITED STATES PATENT OFFICE 2,010,689

ALCOHOLYSIS OF OLEFINE DIESTERS

Gerald H. Coleman and Garnett V. Moore, Midland, Mich., assignors to The Dow Chemical Company, Midland, Mich., a corporation of Michigan No Drawing. Application March 16, 1934, Serial No. 715,938

19 Claims. (Cl. 260—106)

This invention concerns the simultaneous preparation of an alkyl ester of a fatty acid and a glycol monoester of the same fatty acid by reacting a primary or secondary monohydric aliphatic alcohol, containing from two to five carbon atoms, inclusively, with an olefine diester having the general formula:

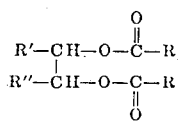

wherein R represents an alkyl group and R' and R'' each represent hydrogen or an alkyl group. The invention particularly concerns the reaction of such alcohol with ethylene diacetate to form simultaneously an alkyl acetate and ethylene glycol monoacetate.

We have found that by heating an olefine diester having the above general formula to a reaction temperature with a substantially anhydrous primary or secondary aliphatic alcohol containing from two to five carbon atoms, an alkyl ester and a glycol monoester can be formed simultaneously and in good yields. The reaction involved is illustrated by the equation:

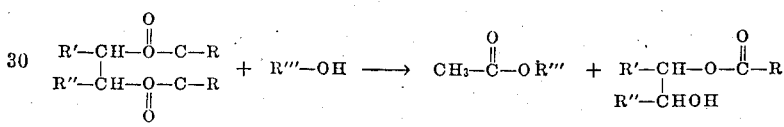

wherein R represents an alkyl group, R' and R'' each represent hydrogen or an alkyl group, and R''' represents an alkyl group containing from two to five carbon atoms.

The reaction does not occur to appreciable extent when the reactants are heated together in the absence of a catalyst at atmospheric pressure. We have discovered, however, that strong acids, soluble acid salts of polybasic strong acids, soluble salts of weak bases and strong acids, and soluble copper compounds catalyze the reaction and that when the reaction mixture is heated at atmospheric pressure to approximately a reflux temperature in the presence of such catalyst, the reaction proceeds smoothly and rapidly. However, the reaction can be carried out satisfactorily under pressure at temperatures above the normal boiling point of the alcohol reactant, either in the presence or absence of a catalyst.

To the accomplishment of the foregoing and related ends, the invention consists in the method hereinafter fully described and particularly pointed out in the claims, the following description and examples setting forth in detail only certain of the various ways in which the principle of the invention may be employed.

Our reaction is carried out by heating an olefine diester having the hereinbefore stated general formula and a concentrated primary or secondary alcohol containing from two to five carbon atoms to a reaction temperature, either in the presence or absence of a catalyst. The reactants may be employed in any desired proportions, but are preferably employed in approximately equimolecular proportions. The alcohol reactant is preferably anhydrous, but may contain as much as 7 per cent water by volume. When the alcohol contains a higher proportion of water, the alkyl ester product is hydrolyzed to a considerable extent.

As a catalyst we may employ any strong acid, e. g. hydrochloric, sulphuric, or phosphoric acid; any soluble acid salt of a polybasic strong acid, e. g. sodium or potassium acid sulphate; or any soluble salt of a weak base and a relatively strong acid, e. g. a chloride or nitrate of iron, cobalt, nickel, zinc, copper; a sulphate or acetate of copper, etc. As is well known all such compounds when dissolved in water produce acidic solutions. When a copper salt is used as catalyst, the salt employed is preferably one which will dissolve in the reaction mixture. The catalyst may be employed in any desired proportion, but it is preferably employed in amount representing not more than 0.15 the molecular equivalent of the olefine diester, since the use of a larger proportion of catalyst is unnecessary and sometimes results in the formation of undesirable by-products.

The temperature to which the reaction mixture must be heated in order to obtain satisfactorily rapid reaction is dependent both upon the particular reactants employed and upon the presence or absence of a catalyst. In the absence of a catalyst, it is necessary to heat the mixture under pressure usually to a temperature at least 50° above the normal boiling point of the alcohol reactant. When a catalyst is present, the reaction may be carried out smoothly and rapidly by heating the mixture at atmospheric pressure to approximately the reflux temperature. The reaction is carried out at a temperature below that at which the alkyl ester and glycol monoester products are appreciably decomposed, preferably at below about 250° C.

The reaction is usually completed after from 2 to 10 hours of heating, but longer heating is sometimes required when no catalyst is employed. The alkyl ester and glycol monoester products are separated by fractionally distilling the reactive mixture. When a non-volatile acid catalyst, e. g. sulphuric acid, is employed in the reaction, the reacted mixture is treated with sufficient base, e. g. sodium hydroxide or carbonate, to neutralize the acid prior to carrying out the distillation, since decomposition occurs when the distillation is carried out under acid conditions.

The following table describes a number of experiments wherein ethylene diacetate was reacted with alcohols in accordance with our invention. Each yield of ethylene glycol monoacetate stated in the table is the per cent of theoretical yield, based on the quantity of ethylene diacetate employed.

Runs 2–11 illustrate the fact that strong acids, soluble copper compounds, and soluble salts of weak bases and strong acids catalyze the reaction of ethylene diacetate with primary and secondary alcohols. The same runs show that such reaction proceeds smoothly and rapidly when carried out by heating the reaction mixture under reflux at atmospheric pressure in the presence of catalyst belonging to the class just mentioned.

A comparison of runs 3, 5, and 9 with runs 4 and 8 shows that under otherwise similar operating conditions, normal alcohols react more rapidly with ethylene diacetate than do the corresponding secondary alcohols.

Runs 12–15 show that the reaction of ethylene diacetate with primary and secondary alcohols can be carried out smoothly and rapidly in the absence of a catalyst by heating the reactants under pressure to temperatures higher than those attainable by heating the mixture at atmospheric pressure. Run 16 illustrates the use of a catalyst in carrying the reaction out under pressure.

In addition to the foregoing examples, we have

Table

| Run No. | Ethylene diacetate gram moles | Alcohol Kind | Alcohol Per cent conc. by vol. | Alcohol Gram moles | Catalyst Kind | Catalyst Gram moles | Reaction temp. °C. | Reaction period hours |
|---|---|---|---|---|---|---|---|---|
| 1 | 1 | Ethyl | 100 | 2 | None | | 88 | 17.5 |
| 2 | 1 | Ethyl | 100 | 0.92 | H₂SO₄ | 0.000125 | 93 | 5 |
| 3 | 1 | n-Propyl | 100 | 0.92 | H₂SO₄ | 0.000125 | 115 | 5 |
| 4 | 1 | Isopropyl | 100 | 0.92 | H₂SO₄ | 0.000125 | 98 | 5 |
| 5 | 1 | n-Butyl | 100 | 0.92 | H₂SO₄ | 0.000125 | 132 | 5 |
| 6 | 1 | n-Butyl | 100 | 2.5 | (CH₃CO₂)₂Cu.H₂O | 0.01 | 122 | 5 |
| 7 | 1 | n-Butyl | 100 | 2.5 | Co(NO₃)₂.6H₂O | 0.01 | 121 | 5 |
| 8 | 1 | Sec. Butyl | 100 | 0.92 | H₂SO₄ | 0.000125 | 116 | 5 |
| 9 | 1 | Isobutyl | 100 | 0.92 | H₂SO₄ | 0.000125 | 125 | 5 |
| 10 | 1 | Isobutyl | 100 | 2.5 | HCl | 0.1 | 111 | 5 |
| 11 | 1 | Isobutyl | 100 | 2.5 | H₃PO₄ | 0.1 | 111 | 5 |
| 12 | 5 | Ethyl | 95 | 13.5 | None | | 150 | 5 |
| 13 | 0.8 | n-Propyl | 100 | 2 | None | | 200 | 5 |
| 14 | 3.34 | n-Butyl | 100 | 6 | None | | 200 | 8 |
| 15 | 5 | Isobutyl | 100 | 12.5 | None | | 200 | 5 |
| 16 | 0.8 | n-Butyl | 100 | 1.89 | (CH₃CO₂)₂Cu.H₂O | 0.01 | 150 | 10 |

| Run No. | Products—Gram moles Alkyl acetate | Products—Gram moles Ethylene glycol monoacetate | Yield of ethylene glycol monoacetate | Remarks |
|---|---|---|---|---|
| 1 | 0.06 | Trace. | Trace. | Mixture heated under reflux—practically no reaction. |
| 2 | 0.77 | 0.89 | 89 | Mixture heated under reflux. |
| 3 | 0.79 | 0.88 | 88 | Do. |
| 4 | 0.30 | 0.53 | 53 | Do. |
| 5 | 0.80 | 0.89 | 89 | Do. |
| 6 | 0.67 | 0.70 | 70 | Do. |
| 7 | 0.82 | 0.84 | 84 | Do. |
| 8 | 0.43 | 0.56 | 56 | Do. |
| 9 | 0.79 | 0.91 | 91 | Do. |
| 10 | 1.08 | 0.96 | 96 | Do. |
| 11 | 1.08 | 0.70 | 70 | Do. |
| 12 | 4.20 | 4.80 | 96 | Mixture heated in a bomb. |
| 13 | 0.83 | 0.70 | 87.5 | Do. |
| 14 | 3.74 | 2.91 | 87 | Do. |
| 15 | 4.90 | 4.98 | 99.5 | Do. |
| 16 | 0.87 | 0.76 | 95 | Do. |

Run 1 of the foregoing table shows that the reaction of ethyl alcohol with ethylene diacetate is extremely sluggish when said compounds are heated together under reflux in the absence of a catalyst. We have also found that no appreciable reaction occurs when ethylene diacetate is heated under reflux in the absence of a catalyst with a propyl, butyl, or amyl alcohol.

prepared propyl propionate and ethylene glycol monopropionate by heating a mixture of ethylene dipropionate and n-propyl alcohol to 175° C. under pressure. We have also prepared n-butyl acetate and propylene glycol monoacetate by heating a mixture of propylene diacetate and n-butyl alcohol under reflux in the presence of sulphuric acid.

Other olefine diesters may similarly be reacted with primary and secondary alcohols to form the corresponding alkyl esters and glycol monoesters. For instance, propylene dibutyrate may be reacted with ethyl alcohol to form ethyl butyrate and propylene glycol monobutyrate simultaneously; butylene-2,3-diacetate may be reacted with amyl alcohol to form amyl acetate and butylene-2,3-glycol monoacetate; an amylene diacetate may be reacted with propyl alcohol to form propyl acetate and amylene-glycol monoacetate, etc.

In the following claims, the expression "substantially anhydrous alcohol" refers to an alcohol which contains not more than 7 per cent by volume of water.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises heating an olefine diester, having the general formula;

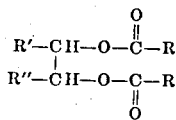

wherein R represents an alkyl group and R' and R" each represent hydrogen or an alkyl group, with a substantially anhydrous alcohol selected from the class consisting of primary and secondary monohydric aliphatic alcohols containing from two to five carbon atoms to a temperature at which considerable reaction occurs.

2. The method which comprises heating an olefine diester, having the general formula;

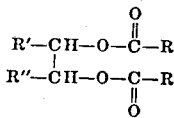

wherein R represents an alkyl group and R' and R" each represent hydrogen or an alkyl group, with a substantially anhydrous alcohol selected from the class consisting of primary and secondary monohydric aliphatic alcohols containing from two to five carbon atoms, at superatmospheric pressure to a reaction temperature at least 50° higher than the normal boiling point of the alcohol reactant.

3. The method which comprises heating an olefine diester, having the general formula;

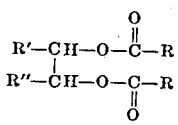

wherein R represents an alkyl group and R' and R" each represent hydrogen or an alkyl group, with a substantially anhydrous alcohol selected from the class consisting of primary and secondary monohydric aliphatic alcohols containing from two to five carbon atoms to a reaction temperature in the presence of a catalyst selected from the class consisting of compounds which dissolve in water to produce acid solutions.

4. The method which comprises heating an olefine diester, having the general formula;

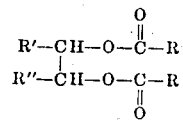

wherein R represents an alkyl group and R' and R" each represent hydrogen or an alkyl group, with a substantially anhydrous primary monohydric aliphatic alcohol containing from two to five carbon atoms at substantially atmospheric pressure to approximately the reflux temperature in the presence of a catalyst selected from the class consisting of compounds which dissolve in water to produce acid solutions, the catalyst being employed in amount representing not more than 0.15 the molecular equivalent of the olefine diester.

5. In a method of making an alkyl ester of a fatty acid and an ethylene glycol monoester of the same fatty acid simultaneously, the step which consists in heating an ethylene diester, having the general formula;

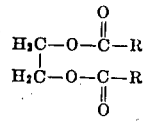

wherein R represents an alkyl group, with a substantially anhydrous alcohol selected from the class consisting of primary and secondary monohydric aliphatic alcohols containing from two to five carbon atoms to a temperature at which considerable reaction occurs.

6. In a method of making an alkyl ester of a fatty acid and an ethylene glycol monoester of the same fatty acid simultaneously, the step which consists in heating an ethylene diester, having the general formula;

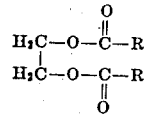

wherein R represents an alkyl group, with a substantially anhydrous alcohol selected from the class consisting of primary and secondary monohydric aliphatic alcohols containing from two to five carbon atoms to a reaction temperature in the presence of a catalyst selected from the class consisting of compounds which dissolve in water to produce acid solutions.

7. In a method of making an alkyl acetate and ethylene glycol monoacetate simultaneously, the step which consists in heating ethylene diacetate with a substantially anhydrous alcohol selected from the class consisting of primary and secondary monohydric aliphatic alcohols containing from two to five carbon atoms to a temperature at which considerable reaction occurs.

8. In a method of making an alkyl acetate and ethylene glycol monoacetate simultaneously, the step which consists in heating ethylene diacetate with a substantially anhydrous alcohol selected from the class consisting of primary and secondary monohydric aliphatic alcohols containing from two to five carbon atoms at superatmospheric pressure to a reaction temperature at least 50° higher than the normal boiling point of the alcohol reactant.

9. In a method of making an alkyl acetate and ethylene glycol monoacetate simultaneously, the step which consists in heating ethylene diacetate with a substantially anhydrous alcohol selected from the class consisting of primary and secondary monohydric aliphatic alcohols containing from two to five carbon atoms to a reaction temperature in the presence of a catalyst selected from the class consisting of compounds which dissolve in water to produce acid solutions.

10. In a method of making an alkyl acetate and ethylene glycol monoacetate simultaneously, the step which consists in heating ethylene diacetate with a substantially anhydrous primary monohydric aliphatic alcohol containing from two to five carbon atoms at substantially atmospheric pressure to approximately the reflux temperature in the presence of a catalyst selected from the class consisting of compounds which dissolve in water to produce acid solutions, the catalyst being employed in amount representing not more than 0.15 the molecular equivalent of the ethylene diacetate.

11. The method which comprises heating an olefine diester having the general formula;

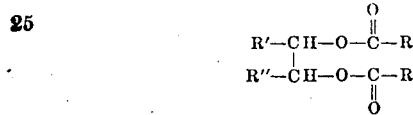

wherein R represents an alkyl group and R' and R'' each represent hydrogen or an alkyl group with substantially anhydrous ethyl alcohol to a temperature at which considerable reaction occurs.

12. The method which comprises heating an olefine diester having the general formula;

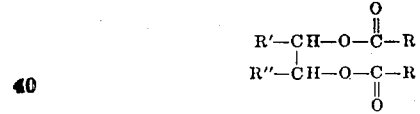

wherein R represents an alkyl group and R' and R'' each represent hydrogen or an alkyl group with substantially anhydrous ethyl alcohol to a reaction temperature in the presence of a catalyst selected from the class consisting of compounds which dissolve in water to produce acid solutions.

13. The method which comprises heating ethylene glycol diacetate with substantially anhydrous ethyl alcohol to a reaction temperature in the presence of sulphuric acid.

14. The method which comprises heating an olefine diester having the general formula;

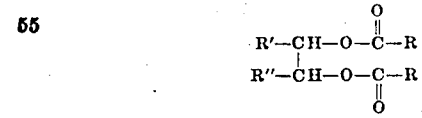

wherein R represents an alkyl group and R' and R'' each represent hydrogen or an alkyl group with a substantially anhydrous propyl alcohol to a temperature at which considerable reaction occurs.

15. The method which comprises heating an olefine diester having the general formula;

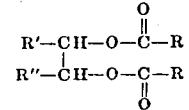

wherein R represents an alkyl group and R' and R'' each represent hydrogen or an alkyl group, with substantially anhydrous isopropyl alcohol to a reaction temperature in the presence of a catalyst selected from the class consisting of compounds which dissolve in water to produce acid solutions.

16. The method which comprises heating ethylene glycol diacetate with substantially anhydrous isopropyl alcohol to a reaction temperature in the presence of sulphuric acid.

17. The method which comprises heating an olefine diester having the general formula;

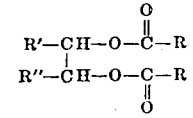

wherein R represents an alkyl group and R' and R'' each represent hydrogen or an alkyl group, with a substantially anhydrous butyl alcohol to a temperature at which considerable reaction occurs.

18. The method which comprises heating an olefine diester having the general formula;

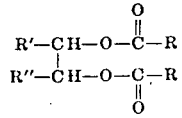

wherein R represents an alkyl group and R' and R'' each represent hydrogen or an alkyl group with substantially anhydrous isobutyl alcohol to a temperature at which reaction occurs in the presence of a catalyst selected from the class consisting of compounds which dissolve in water to produce acid solutions.

19. The method which comprises heating ethylene glycol diacetate with substantially anhydrous isobutyl alcohol to a reaction temperature in the presence of sulphuric acid.

GERALD H. COLEMAN.
GARNETT V. MOORE.